US008430144B2

(12) United States Patent
Lin

(10) Patent No.: US 8,430,144 B2
(45) Date of Patent: Apr. 30, 2013

(54) EDGE BANDING MACHINE

(76) Inventor: Chin-Chi Lin, Taichung (TW)

( * ) Notice: Subject to any disclaimer, the term of this patent is extended or adjusted under 35 U.S.C. 154(b) by 281 days.

(21) Appl. No.: 13/071,301

(22) Filed: Mar. 24, 2011

(65) Prior Publication Data

US 2012/0240846 A1 Sep. 27, 2012

(51) Int. Cl.
*B32B 37/12* (2006.01)

(52) U.S. Cl.
USPC ........... 156/459; 156/468; 156/443; 118/244; 118/246; 118/252; 53/203; 53/430

(58) Field of Classification Search .................. 156/443, 156/459, 468; 53/203, 430; 118/244, 246, 118/252
See application file for complete search history.

(56) References Cited

U.S. PATENT DOCUMENTS 6,263,938 B1 * 7/2001 Maioli et al. .................. 156/447

FOREIGN PATENT DOCUMENTS

WO WO 2006076871 A1 * 7/2006

* cited by examiner

*Primary Examiner* — George Koch
(74) *Attorney, Agent, or Firm* — Christensen O'Connor Johnson Kindness PLLC

(57) ABSTRACT

An edge banding machine includes a machine body unit having a mounting plate, a glue-applying unit, a glue-scratching unit and a transmission unit. The glue-applying unit includes a glue container mounted fixedly on the mounting plate, a supporting member disposed fixedly and directly above the glue container and a glue-applying roller rotatably extending into the glue container. The glue-scratching unit includes a rotating shaft disposed rotatably on the supporting member, a glue-scratching plate disposed fixedly on the rotating shaft and extending toward the glue-applying roller, an adjustment rod disposed adjustably on the cover, and a connecting member connected between the adjustment rod and the rotating shaft such that movement of the adjustment rod results in rotation of the rotating shaft.

5 Claims, 11 Drawing Sheets

EDGE BANDING MACHINE

BACKGROUND OF THE INVENTION

1. Field of the Invention

The invention relates to an edge banding machine, more particularly to an edge banding machine that can adjust the thickness of glue applied to an edge band.

2. Description of the Related Art

At present, there is a typical edge banding machine, as disclosed in International Patent Publication Number WO2006076871, that includes a glue-applying unit and a transmission unit. The glue-applying unit has a glue container and a glue-applying roller that is rotatable relative to the glue container. The transmission unit has a front conveying wheel and a rear conveying wheel that are disposed respectively at two sides of the glue-applying roller, and a belt that is connected between the front conveying wheel and the rear conveying wheel for driving the glue-applying roller.

In use, an edge band is moved by the front conveying wheel to pass through the glue-scratching unit, so that it is moved by the front conveying wheel to pass past the glue-applying roller. Hence, glue smeared on the glue-applying roller is applied to one of two opposite side surfaces of the edge band, after which, the rear conveying wheel moves the edge band out of the edge banding machine and adheres the edge band to a workpiece that is adjacent to the rear conveying wheel. In such a manner, an edge banding operation is completed.

However, since the glue-applying roller is rotated to apply the glue from the glue container onto the surface of the edge band, the thickness of the glue on the glue-applying roller is non-uniform. As a result, during the edge banding operation, the edge band cannot be evenly adhered on the work piece, and in this manner, there will be some work burdens imposed on subsequent operation for remedying this drawback.

SUMMARY OF TEE INVENTION

Therefore, the main object of this invention is to provide an edge banding machine that is convenient for an edge band to be fed in.

Accordingly, an edge banding machine of this invention comprises a machine body unit, a glue-applying unit, a glue-scratching unit and a transmission unit.

The machine body unit includes a mounting plate. The glue-applying unit includes a glue container mounted fixedly on the mounting plate, a supporting member disposed fixedly and directly above the glue container, a cover disposed fixedly on and above the supporting member, and a glue-applying roller disposed pivotally on the cover, extending into the glue container, and rotatable relative to the glue container and the supporting member. The glue-scratching unit includes a rotating shaft disposed rotatably on the supporting member, a glue-scratching plate disposed fixedly on the rotating shaft and extending toward the glue-applying roller, an adjustment rod disposed adjustably on the cover, and a connecting member connected between the adjustment rod and the rotating shaft such that movement of the adjustment rod relative to the cover results in rotation of the rotating shaft relative to the supporting member. The transmission unit includes a pair of front and rear conveying wheels disposed pivotally on the mounting plate and located respectively to two opposite sides of the glue-applying roller, a transmission member connected between and driven by the front and rear conveying wheels to rotate the glue-applying roller, and a motor operable for driving the front and rear conveying wheels to rotate.

The effect of this invention is: due to the inclusion of the glue-scratching unit, glue on the glue-applying roller can be maintained at a fixed thickness so as to ensure the quality of the edge bands finished.

BRIEF DESCRIPTION OF THE DRAWINGS

Other features and advantages of this invention will become apparent in the following detailed description of a preferred embodiment with reference to the accompanying drawings, of which.

DETAILED DESCRIPTION OF THE PREFERRED EMBODIMENT

Figure 1:
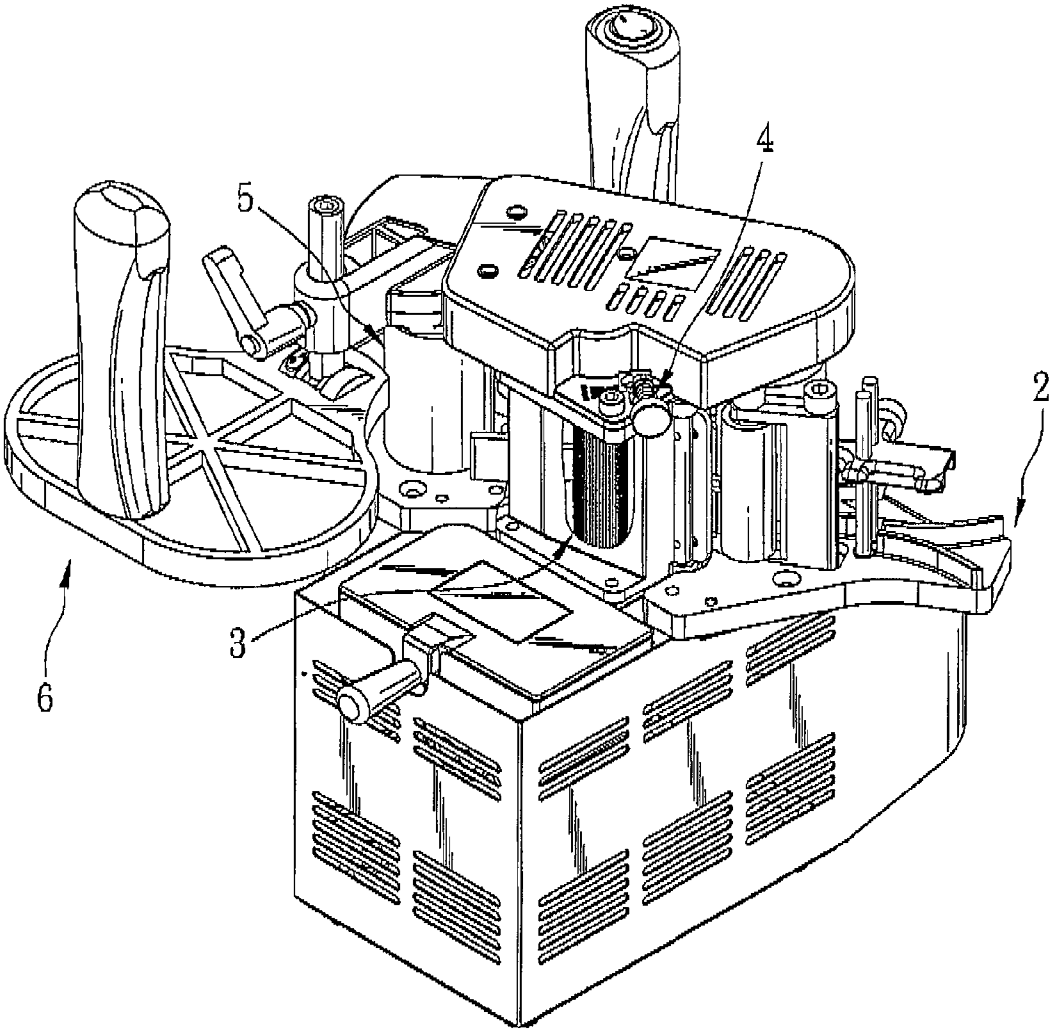
FIG. 1 is an assembled perspective view of the preferred embodiment of an edge banding machine according to this invention.
Figure 2:
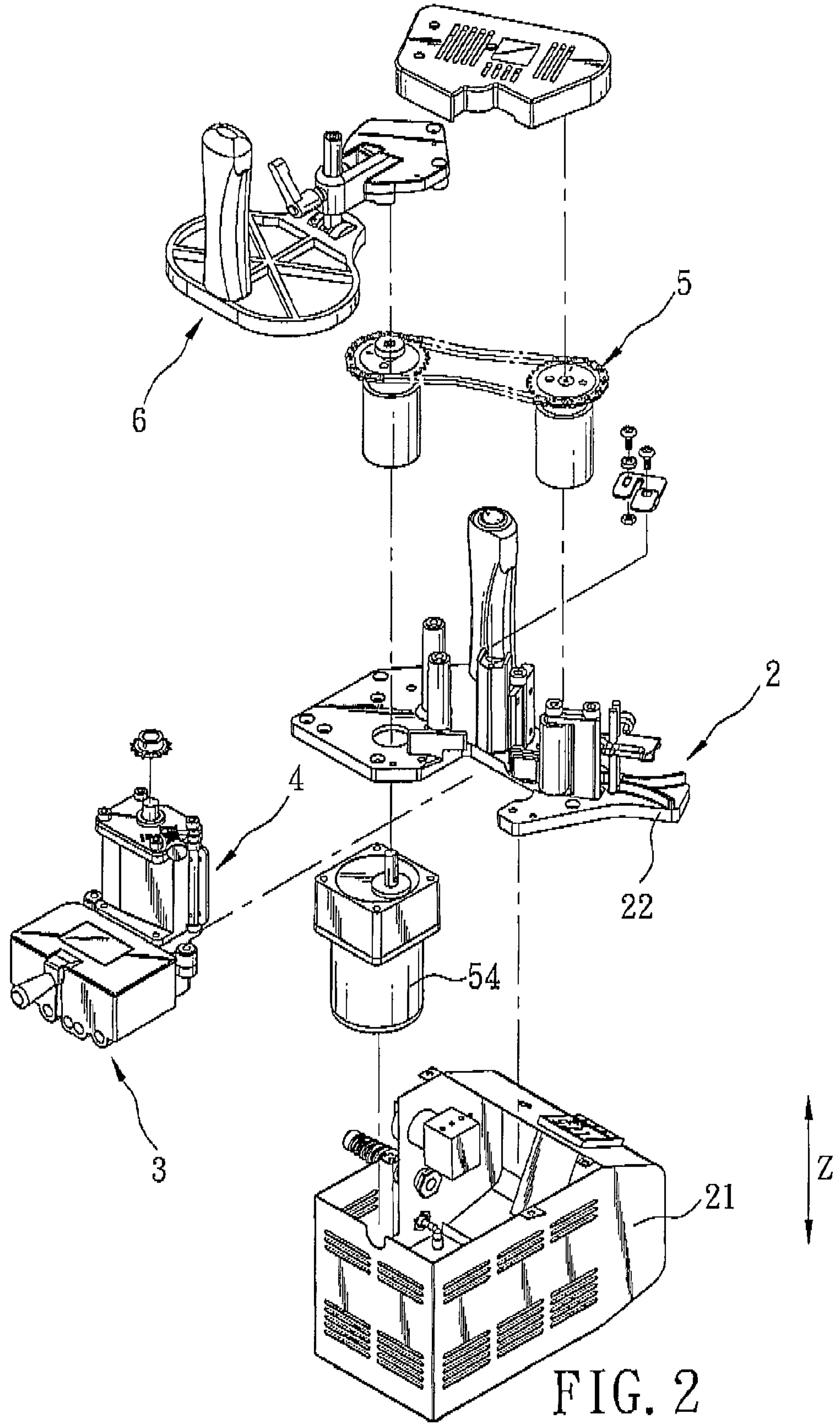
FIG. 2 is a partly exploded perspective view of the preferred embodiment.
Figure 3:
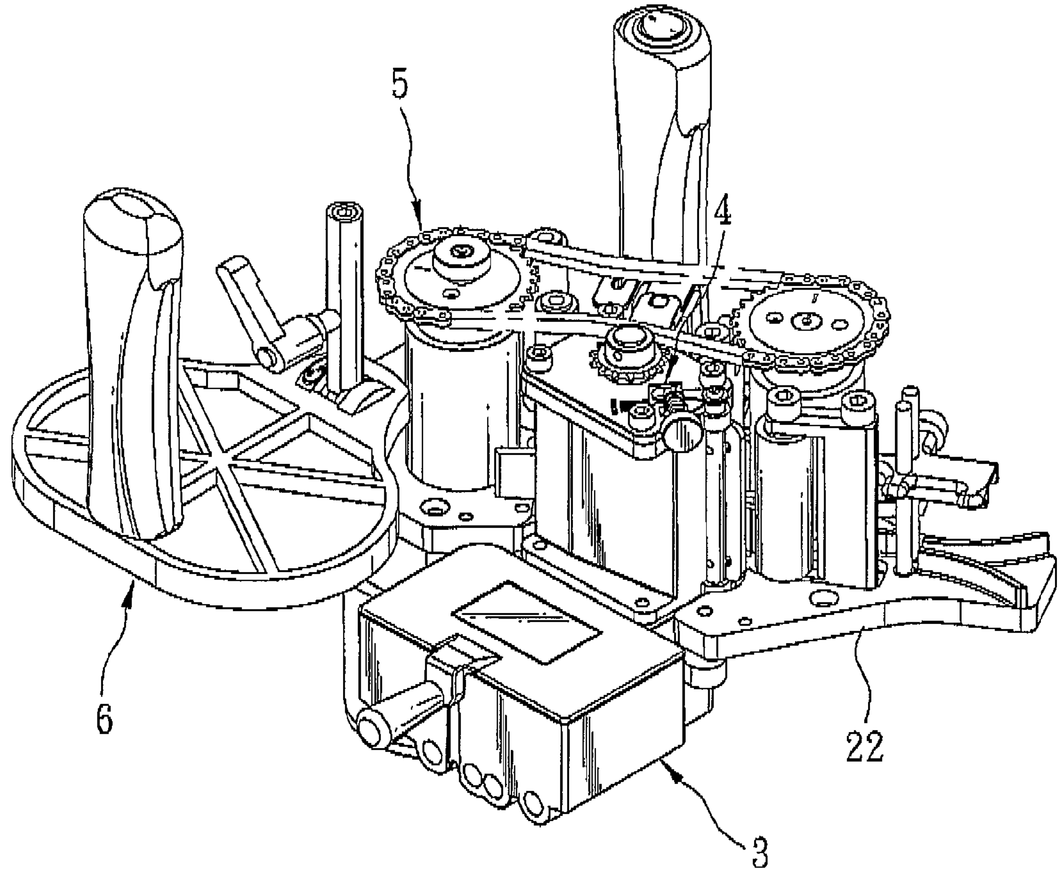
FIG. 3 is a fragmentary assembled perspective view of the preferred embodiment.

Referring to FIGS. 1 to 3, the preferred embodiment of an edge banding machine according to this invention is shown to have a machine body unit 2, a glue-applying unit 3, a glue-scratching unit 4, a transmission unit 5 and an adjustable grip unit 6.

Figure 4:
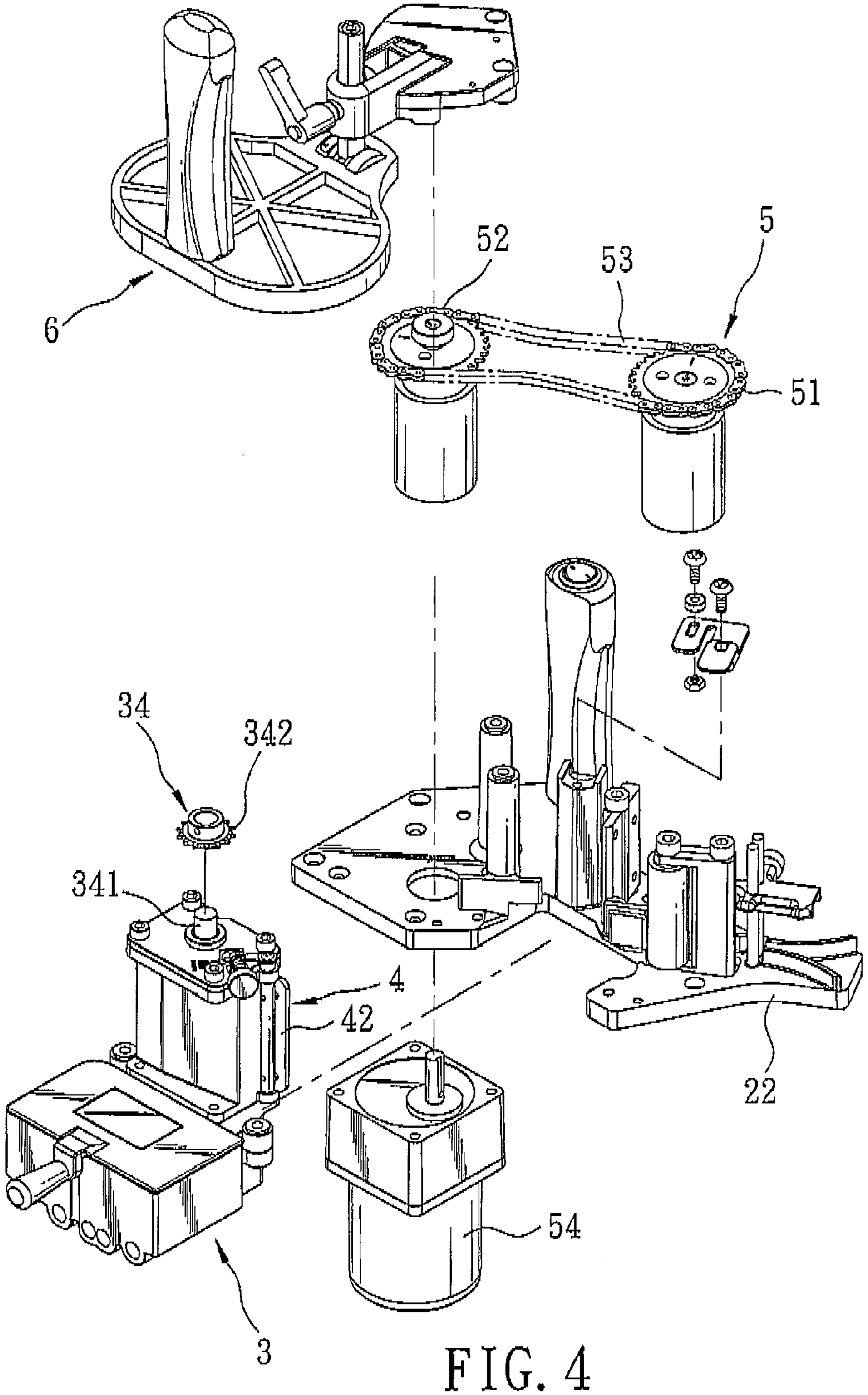
FIG. 4 is a fragmentary, partly exploded perspective view of the preferred embodiment.

Referring to FIGS. 2 to 4, the machine body unit 2 includes a machine housing 21 and a mounting plate 22 mounted fixedly on the machine housing 21.

Figure 5:
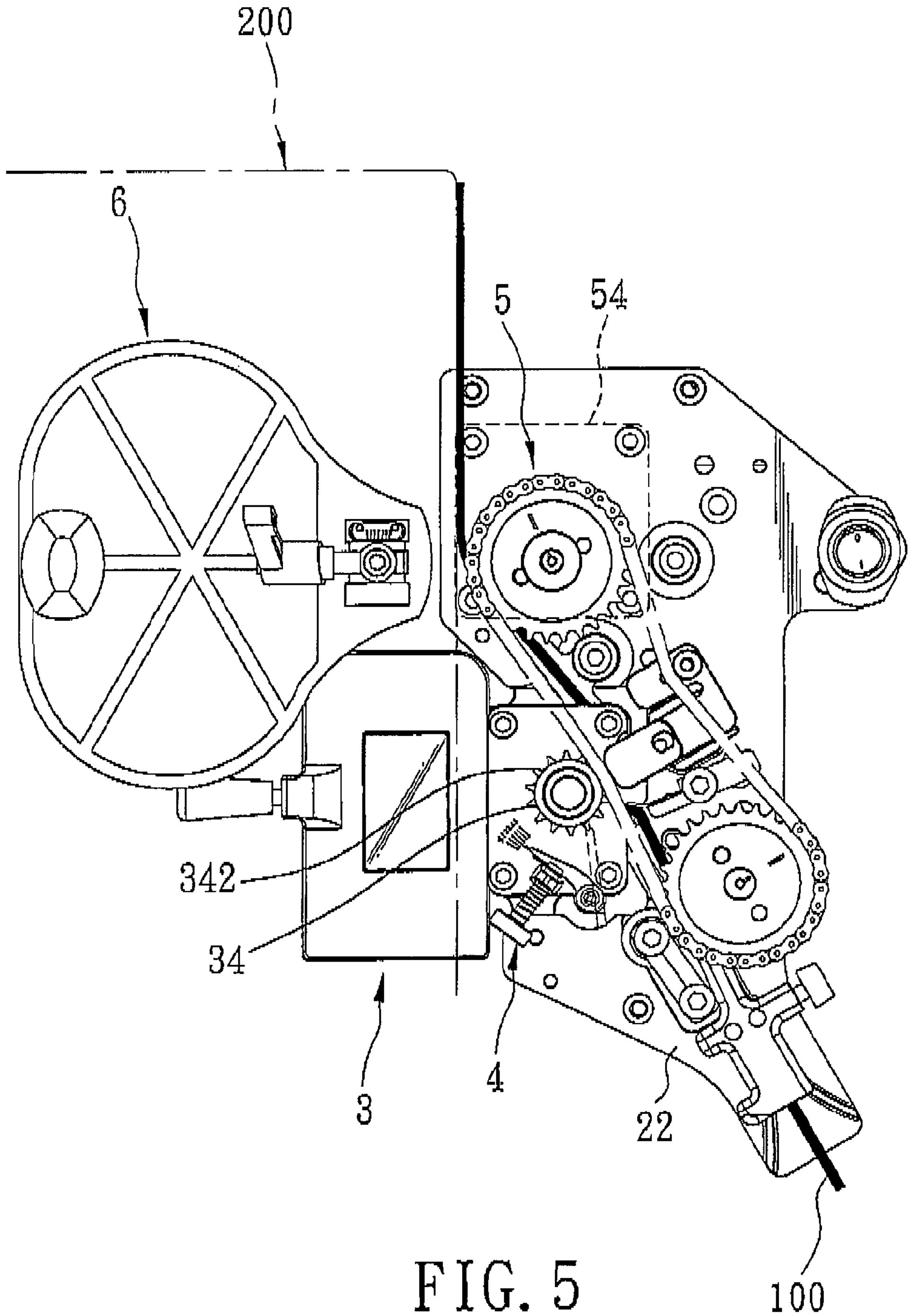
FIG. 5 is a fragmentary top sectional view of the preferred embodiment.
Figure 6:
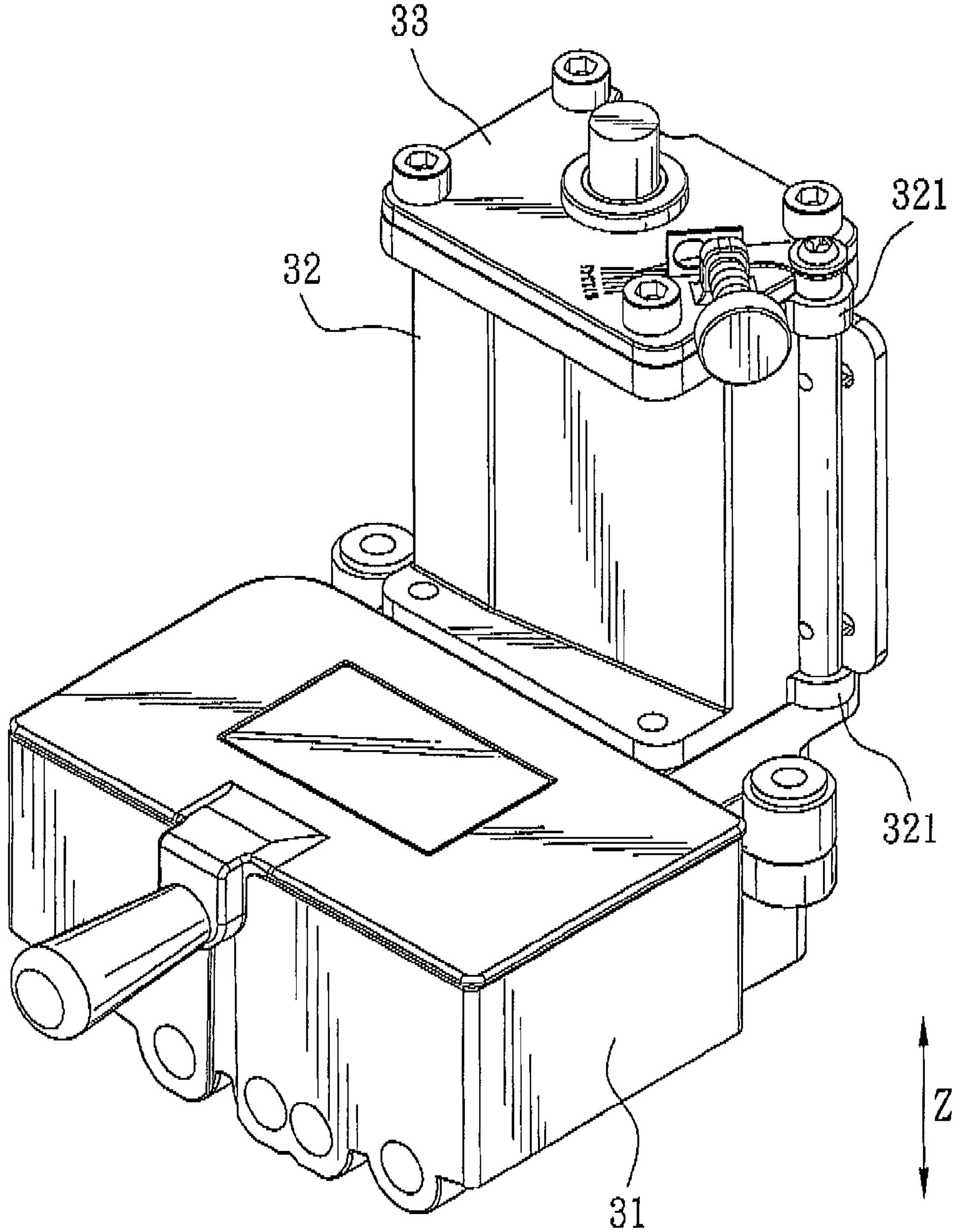
FIG. 6 is an assembled perspective view of a glue-scratching unit and a glue-applying unit of the preferred embodiment.
Figure 7:
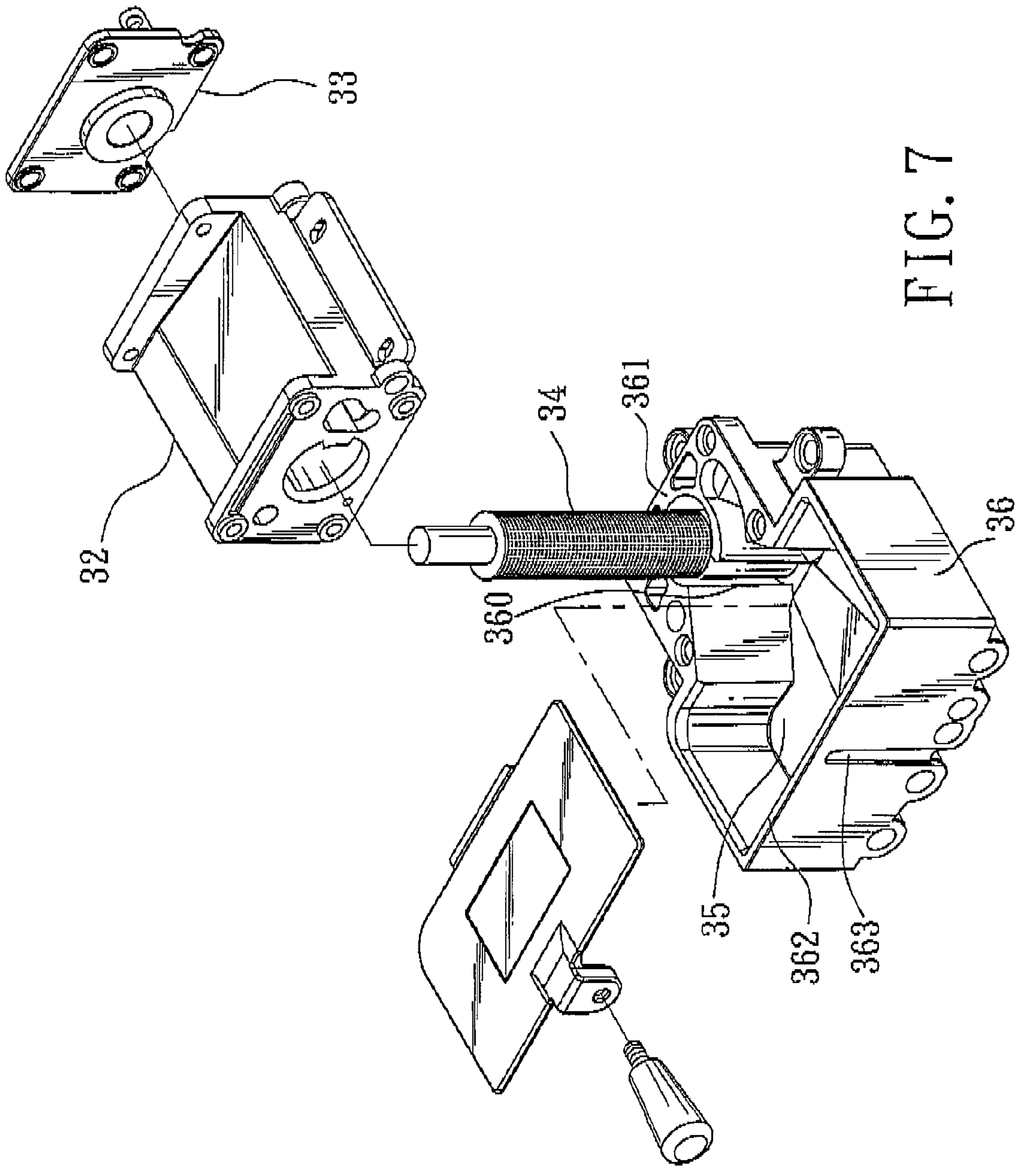
FIG. 7 is an exploded perspective view of the glue-scratching unit and the glue-applying unit of the preferred embodiment.

Referring to FIGS. 5 to 7, the glue-applying unit 3 includes a glue container 31 mounted fixedly on the mounting plate 22, a supporting member 32 disposed fixedly and directly above the glue container 31, a cover 33 disposed fixedly on and above the supporting member 32, and a glue-applying roller 34 disposed pivotally on the cover 33, extending into the glue container 31, and rotatable relative to the glue container 31 and the supporting member 32 for applying glue over an edge band 100.

The glue container 31 has an accommodating space 35 permitting the glue-applying roller 34 to extend therein, and a surrounding wall 36 defining the accommodating space 35.

The surrounding wall 36 includes a first wall portion 361 disposed around the glue-applying roller 34 and having an open side 360, and a second wall portion 362 connected to the open side 360 of the first wall portion 361 and wider than the first wall portion 361.

Figure 8:
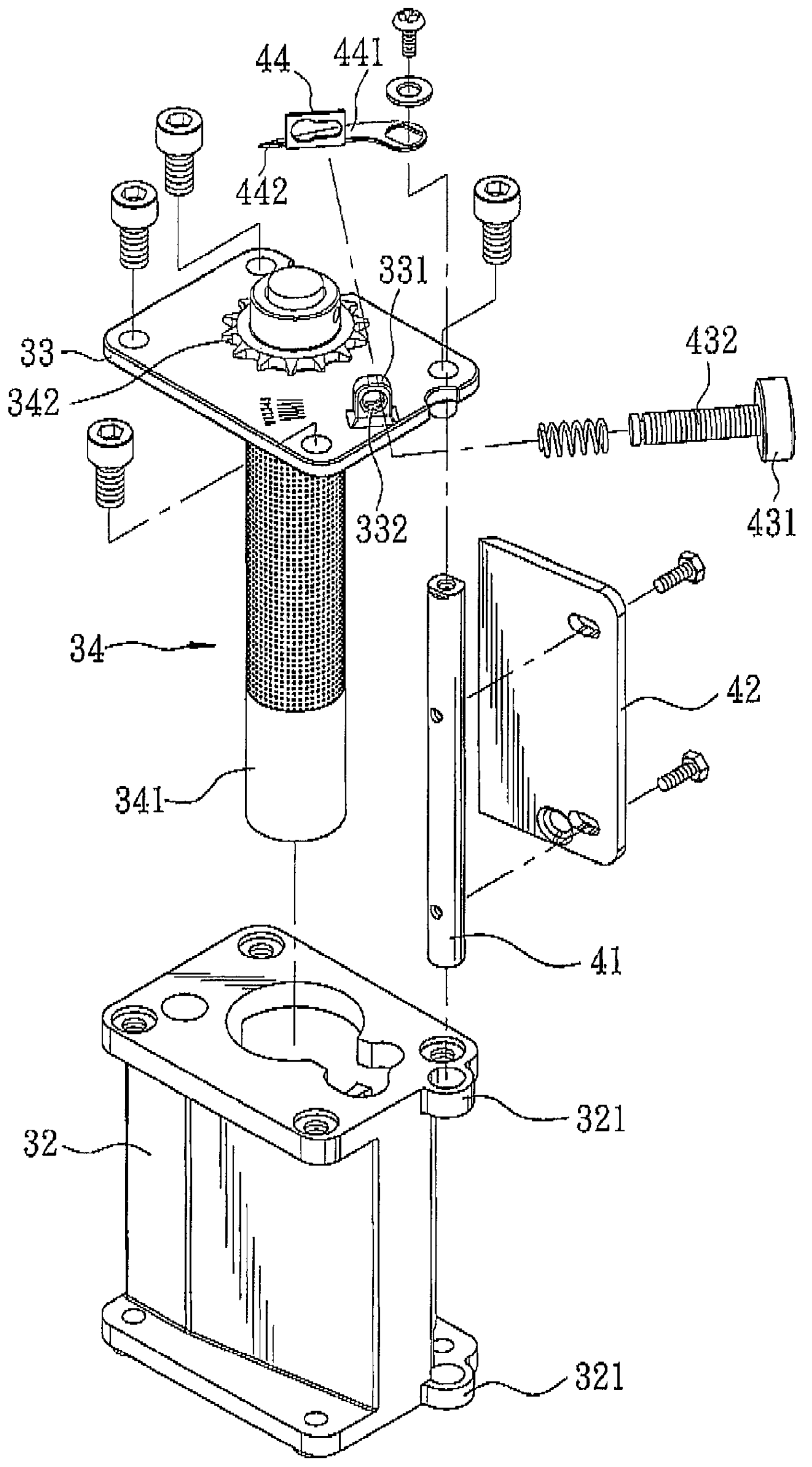
FIG. 8 is a partly exploded perspective view of the glue-scratching unit and the glue-applying unit of the preferred embodiment.
Figure 9:
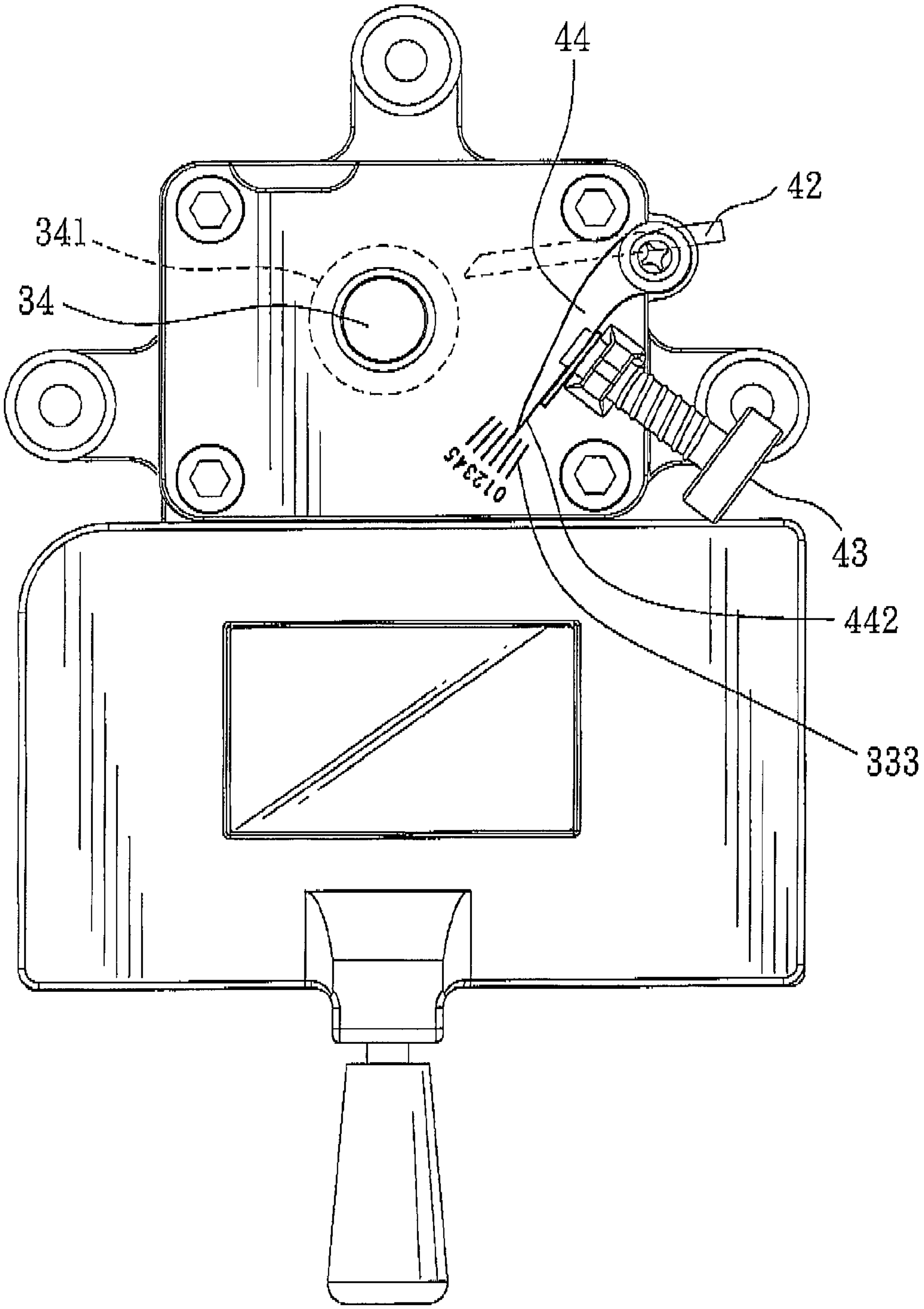
FIG. 9 is a top view of the glue-applying roller and the glue-scratching unit of the preferred embodiment.

Referring to FIGS. 6, 8 and 9, the supporting member 32 has two spaced-apart lugs 321 spaced apart from each other along a vertical direction (Z).

The cover 33 includes a protruding block 331 extending upwardly from a top surface thereof and formed with a threaded hole 332, and a scale 333 (see FIG. 9) provided on the top surface thereof.

The glue-applying roller 34 has a roller body 341 mounted pivotably on the cover 33 and a transmission wheel 342 having a sprocket mounted coaxially and fixedly on the roller body 341.

The glue-scratching unit 4 includes a rotating shaft 41 mounted pivotably on the spaced-apart lugs 321 of the supporting member 32, a glue-scratching plate 42 disposed fixedly on the rotating shaft 41 and extending toward the glue-applying roller 34, an adjustment rod 43 disposed adjustably on the cover 33, and a connecting member 44 connected between the adjustment rod 43 and the rotating shaft 41 such that movement of the adjustment rod 43 relative to the cover 33 results in rotation of the rotating shaft 41 relative to the supporting member 32.

The adjustment rod 43 has a head portion 431 and a threaded portion 432 that is connected to the head portion 431 and that engages the threaded hole 332.

The connecting member 44 has a connecting portion 441 connected to the threaded portion 432 of the adjustment rod 43 and the rotating shaft 41, and a sharp portion 442 extending outwardly from the connecting portion 441, and aligned with the scale 333. In this embodiment, the dispositions of the scale 333 and the sharp portion 442 can be used by a user for visual angular adjustment. When the length of a portion of the adjustment rod 43 threaded in the threaded hole 332 is adjusted, an assembly of the connecting member 44, the rotating shaft 41 and the glue-scratching plate 42 is driven to rotate about the rotating shaft 41, so as to change the distance between the glue-scratching plate 42 and the glue-applying roller 34.

Referring to FIGS. 3 to 5, the transmission unit 5 includes a pair of front and rear conveying wheels 51, 52, disposed pivotally on the mounting plate 22 and located respectively to two opposite sides of the glue-applying roller 34, a transmission member 53 connected between and driven by the front and rear conveying wheels 51, 52 to rotate the glue-applying roller 34, and a motor 54 operable for driving the front and rear conveying wheels 51, 52 to rotate. In this embodiment, the motor 54 is operable to rotate the rear conveying wheel 52 to thereby drive the transmission member 53.

Figure 10:
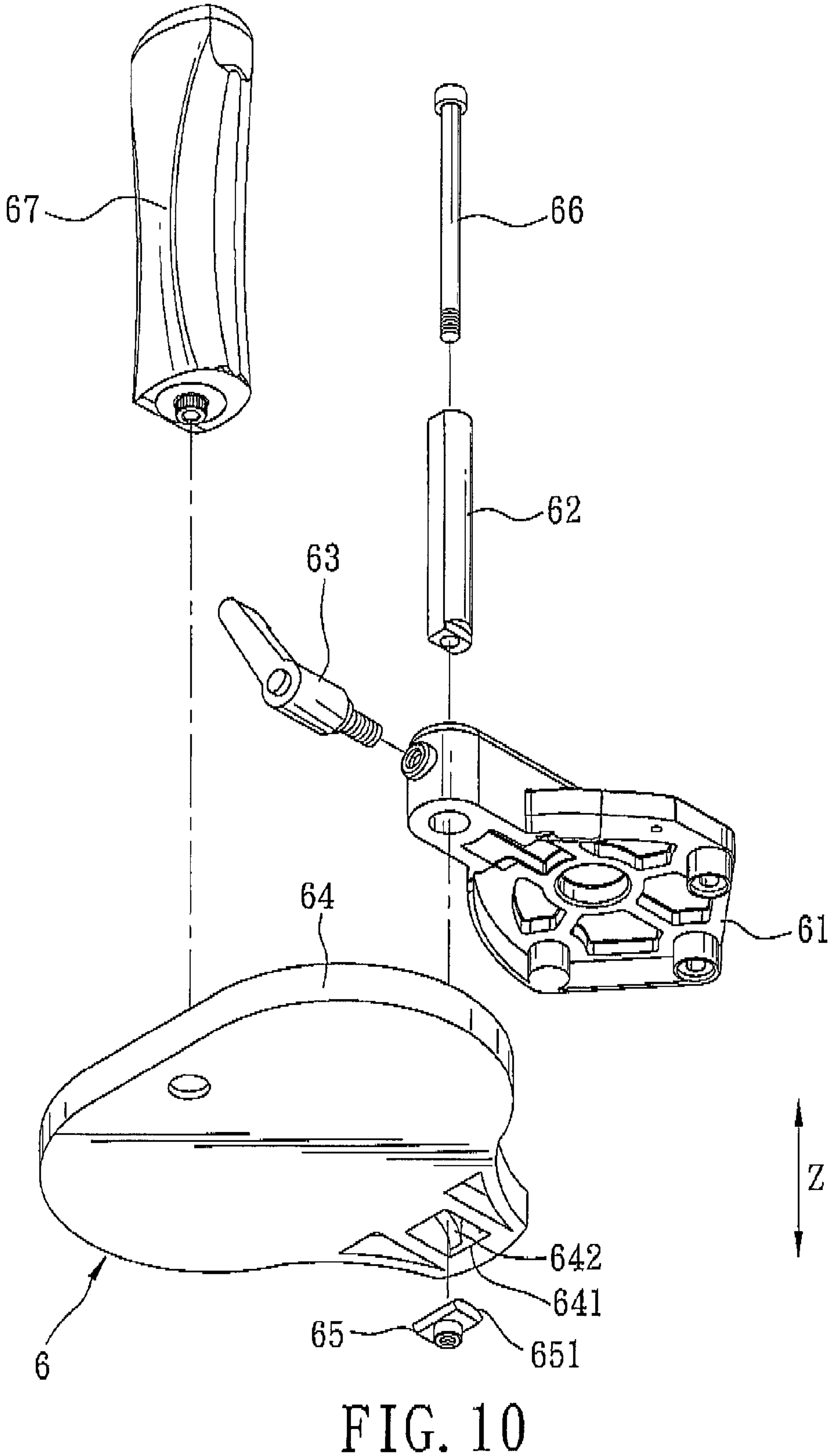
FIG. 10 is an exploded perspective view of a grip unit of the preferred embodiment.
Figure 11:
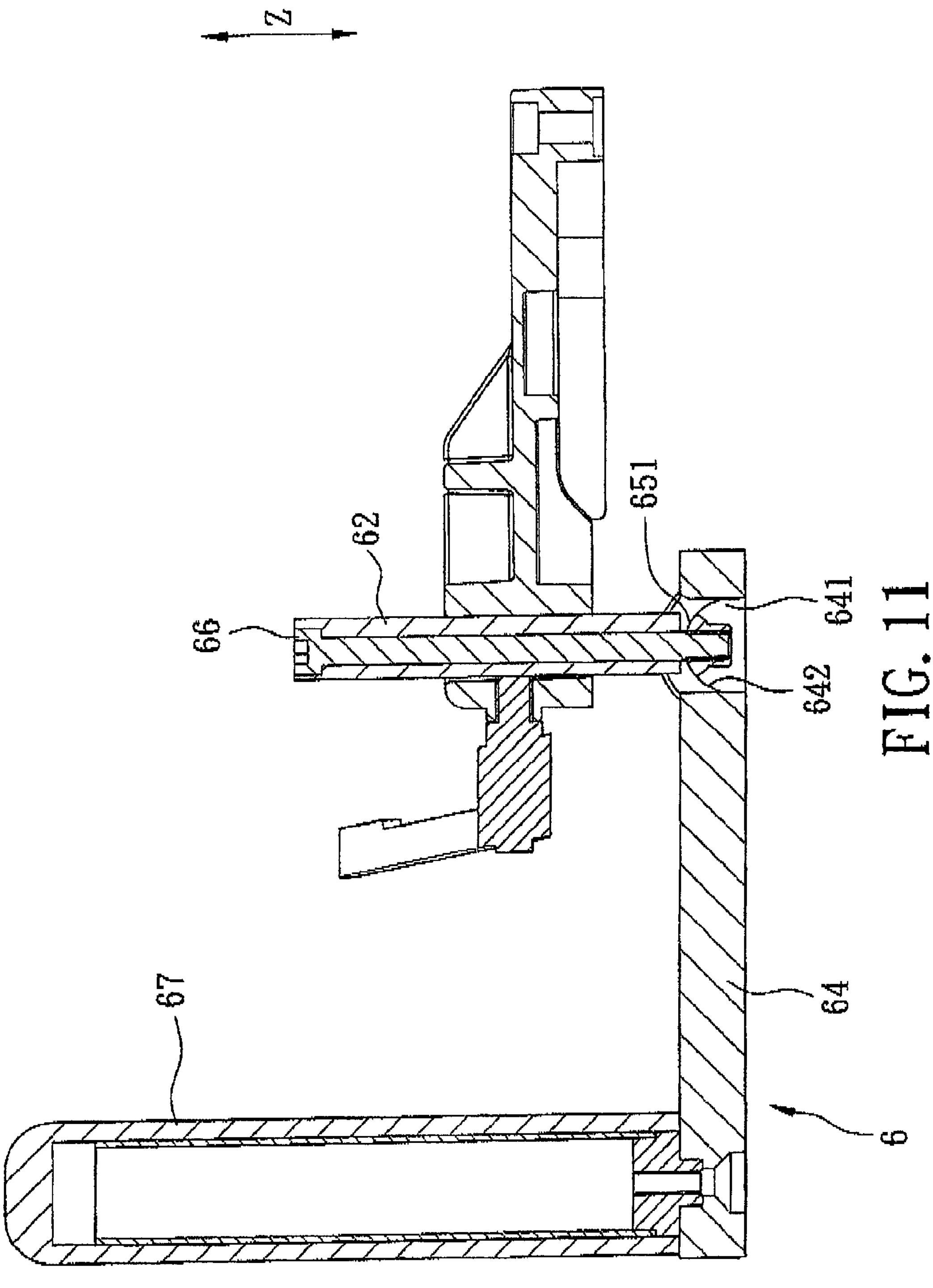
FIG. 11 is a sectional view of the grip unit of the preferred embodiment.

Referring again to FIG. 2 and further to FIGS. 10 and 11, the grip unit 6 includes a mounting frame 61 mounted fixedly to the machine body unit 2, an adjusting sleeve 62 extending through and movable vertically relative to the mounting frame 2, a lock bolt 63 for locking the adjusting sleeve 62 on the mounting frame 61, an internally threaded member 65 disposed under the adjusting sleeve 62, a rotating frame 64 disposed between the adjusting sleeve 62 and the internally threaded member 65 and rotatable relative to the adjusting sleeve 62, a headed threaded rod 66 extending through the adjusting sleeve 62 to engage threadably the internally threaded member 65 so as to clamp the rotating frame 64 between the adjusting sleeve 62 and the internally threaded member 65, and a grip 67 mounted fixedly to the rotating frame 64.

The rotating frame 64 has an accommodating groove 641 for receiving the internally threaded member 65, and a first curved surface 642 adjacent to the accommodating groove 641 and facing away from the adjusting sleeve 62. The internally threaded member 65 has a second curved surface 651 in contact with the first curved surface 642 of the rotating frame 64. When the threaded rod 66 is loosened, the grip 67 can be operated to rotate the rotating frame 64 about the adjusting sleeve 62 such that the first curved surface 642 and the second curved surface 651 move on each other.

Referring to FIGS. 4, 5, 7 and 8, during the edge banding operation, glue accommodated in the accommodation space 35 is moved as a result of rotation of the roller body 341 to come into contact with an annular outer surface of the roller body 341. Subsequently, the glue on the roller body 341 is scraped by the glue-scratching unit 4, and thus is maintained at an appropriate thickness. Hence, when the edge band 100 is moved by the front conveying wheel 51, the one of the side surfaces of the edge band 100 passes past the roller body 341 of the glue-applying roller 34 to allow the glue to be applied thereto, after which, the edge band 100 is moved by the rear conveying wheel 52 out of the edge banding machine and is adhered to a workpiece 200 that is adjacent to the rear conveying wheel 52, thereby completing the edge banding operation.

From the foregoing, as compared to the above-mentioned conventional edge banding machines, the advantages of this invention can be summarized as follows:

1) Through operation of the adjusting rod 43, the distance between the glue-scratching plate 42 and the roller body 341 can be adjusted so that the glue on the roller body 341 is maintained at appropriate thickness so as to ensure the finishing quality.

2) since the second wall portion 362 of the surrounding wall 36 is relatively wide, the accommodation space 35 is large, so that more glue can be placed therein so as to lengthen the manufacturing service time.

3) The grip 67 of the grip unit 6 can be rotated in such a manner to move the first curved surface. As such, this invention is convenient to finish non-planar surfaces of workpieces during the edge banding operation.

While this invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An edge banding machine comprising:

a machine body unit including a mounting plate;

a glue-applying unit including a glue container mounted fixedly on said mounting plate, a supporting member disposed fixedly and directly above said glue container, a cover disposed fixedly on and above said supporting member, and a glue-applying roller disposed pivotally on said cover, extending into said glue container, and rotatable relative to said glue container and said supporting member;

a glue-scratching unit including a rotating shaft disposed rotatably on said supporting member, a glue-scratching plate disposed fixedly on said rotating shaft and extending toward said glue-applying roller, an adjustment rod disposed adjustably on said cover, and a connecting member connected between said adjustment rod and said rotating shaft such that movement of said adjustment rod relative to said cover results in rotation of said rotating shaft relative to said supporting member; and a transmission unit including a pair of front and rear conveying wheels disposed pivotally on said mounting plate and located respectively to two opposite sides of said glue-applying roller, a transmission member connected between and driven by said front and rear conveying wheels to rotate said glue-applying roller, and a motor operable for driving said front and rear conveying wheels to rotate.

2. The edge banding machine as claimed in claim 1, wherein said connecting member has a connecting portion connected to said adjustment rod and said rotating shaft, said supporting member having two spaced-apart lugs permitting extension of said rotating shaft therethrough, said cover having a threaded hole permitting said adjustment rod to be threaded therein, said adjustment rod having a head and a threaded portion engaging said threaded hole and connected to said connecting portion of said connecting member.

3. The edge banding machine as claimed in claim 2, wherein said connecting member further has a sharp portion extending from said connecting portion, said cover further having a top surface provided with a scale aligned with said sharp portion of said connecting member.

4. The edge banding machine as claimed in claim 1, wherein said glue container has an accommodating space permitting said glue-applying roller to extend therein, and a surrounding wall defining said accommodating space and including a first wall portion disposed around said glue-applying roller and having an open side, and a second wall portion connected to said open side of said first wall portion and wider than said first wall portion.

5. The edge banding machine as claimed in claim 1, further comprising at least one grip unit, said grip unit including a mounting frame mounted fixedly to said machine body unit, an adjusting sleeve extending through and movable vertically relative to said mounting frame, a lock bolt for locking said adjusting sleeve on said mounting frame, an internally threaded member disposed under said adjusting sleeve, a rotating frame disposed between said adjusting sleeve and said internally threaded member and rotatable relative to said adjusting sleeve, a threaded rod extending through said adjusting sleeve to engage threadably said internally threaded member so as to clamp said rotating frame between said adjusting sleeve and said internally threaded member, and a grip mounted fixedly to said rotating frame, said rotating frame having an accommodating groove for receiving said internally threaded member, and a first curved surface adjacent to said accommodating groove and facing away from said adjusting sleeve, said internally threaded member having a second curved surface in contact with said first curved surface of said rotating frame.

* * * * *